United States Patent [19]
Oshiro et al.

[11] Patent Number: 5,837,952
[45] Date of Patent: Nov. 17, 1998

[54] MAT SWITCH

[75] Inventors: Kazuhisa Oshiro; Toyomi Yoshida; Hiroyuki Keino, all of Saitama, Japan

[73] Assignee: Combi Corporation, Tokyo, Japan

[21] Appl. No.: 865,833

[22] Filed: May 30, 1997

[30]       Foreign Application Priority Data

Jun. 4, 1996 [JP] Japan ................................. 8-142028

[51] Int. Cl.$^6$ ............................ H01H 3/02; H01H 13/16; H01H 13/70; G06F 3/02
[52] U.S. Cl. ....................................... 200/86 R; 200/86.5
[58] Field of Search ................................. 200/5 A, 85 R, 200/85 A, 86 R, 86.5, 61.43

[56]             References Cited

U.S. PATENT DOCUMENTS

| | | | |
|---|---|---|---|
| 3,243,540 | 3/1966 | Miller | 20/86 R X |
| 3,283,096 | 11/1966 | Horton | 200/86 R X |
| 3,308,253 | 3/1967 | Krakinowski | 200/86 R X |
| 3,321,592 | 5/1967 | Miller | 200/61.43 X |
| 3,509,360 | 4/1970 | Miller | 200/86 R X |
| 4,121,488 | 10/1978 | Akiyama | 200/86.5 X |
| 4,137,116 | 1/1979 | Miller | 200/86 R X |
| 4,497,989 | 2/1985 | Miller | 200/86 R |
| 4,570,039 | 2/1986 | Osawa et al. | 200/5 A |
| 4,684,767 | 8/1987 | Phalen | 200/5 A |

FOREIGN PATENT DOCUMENTS 62-43017  2/1987  Japan .
4126633  11/1992  Japan .

*Primary Examiner*—J. R. Scott
*Attorney, Agent, or Firm*—Sughrue, Mion, Zinn, Macpeak & Seas, PLLC

[57]            ABSTRACT

In a mat switch, a plurality of switch regions for inputting the plurality of data are provided, each of the switch regions has a laminate structure which is formed by laminating an upper electrode sheet, a spacer, and a lower electrode sheet in the stated order; and a back board is provided below the lower electrode sheet in each of the switch regions. The backboards prevent the switch regions from being folded down.

2 Claims, 11 Drawing Sheets

MAT SWITCH

BACKGROUND OF THE INVENTION

1. Field of the Invention

This invention relates to a mat switch which is used to input a plurality of data to an apparatus which is adapted to reproduce on a video terminal the data which have been recorded, for instance, in an optical disk.

2. Related Art

Recently, a multi-media apparatus has been known in the art which reproduces audio and/or video data which are recorded, for instance, in an optical disk. A multi-media apparatus of this type designed as follows: that is, it includes a computer system so that audio and/or video data are reproduced which are recorded in an optical disk such as a CD-ROM. By operating a controller having a switch which is connected to the apparatus, an user such as a child interactively controls (operates) an image and/or sound produced by the video terminal. This multi-media apparatus is intended to be marketed for home use.

A mat switch, which is operated as a child presses it with his feet, is applied to a foot-stamping type sound generating device (disclosed by Unexamined Japanese Utility Patent Publication No. 126633/1994 and Unexamined Japanese Patent Publication No. 43017/1987). The mat switch has a laminate structure which is formed by stacking a lower electrode sheet, a spacer, and an upper electrode sheet in the stated order. The upper surface of the mat switch is covered with a decorative sheet, and the lower surface with a rear sheet. When a child presses the mat switch with his foot, the upper electrode sheet is bent at a hole formed in the spacer, thus being brought into contact with the lower electrode sheet; that is, a switching operation is carried out.

In the case where the mat switch is not used, it is folded down and stored. Hence, a is liable to occur which is due to the folding of the mat switch.

That is, as the mat switch is repeatedly used and stored, the upper electrode sheet is creased, so that the upper electrode sheet becomes uneven, having ridges and grooves along the creases thus formed. Therefore, even if the mat switch is not depressed with the foot, the ridges formed along the creases are brought into contact with the lower electrode sheet; that is, the switching operation takes place.

On the other hand, if, while the mat switch is being used, the mat switch is lightly folded with its edge with the hand by mistake, then the upper electrode sheet is brought into contact with the lower electrode sheet at the hole of the spacer; that is, the switching operation is carried out although the mat switch is not pressed with the feet.

SUMMARY OF THE INVENTION

Accordingly, an object of the invention is to eliminate the above-described difficulties accompanying a conventional mat switch. More specifically, an object of the invention is to provide a mat switch which is free from a difficulty that, when it is folded down, it performs an unintended switching operation.

According to foregoing object of the invention, there is provided mat switch which inputs a plurality of data to an apparatus to operate a video terminal connected to the apparatus comprising:

a plurality of switch regions for inputting the plurality of data;

a laminate structure of each of the switch regions which is formed by laminating an upper electrode sheet, a spacer, and a lower electrode sheet in the stated order; and a back board provided below the lower electrode sheet in each of the switch regions.

According to foregoing object of the invention, there is provided a mat switch which inputs a plurality of data to an apparatus to operate a video terminal connected to the apparatus, a plurality of switch regions for inputting the plurality of data is provided, and each of the switch regions has a laminate structure which comprises:

a cover sheet as the uppermost layer;

a cushioning sheet provided below the cover sheet;

an upper electrode sheet provided below the cushioning sheet;

an insulating spacer having a number of holes which is provided below the upper electrode sheet;

a lower electrode sheet on which an electrically conductive pattern is formed, the lower electrode sheet being provided below the insulating spacer;

a pocket formed by two vinyl sheets which are provided below lower electrode sheet; and a back board inserted into the pocket, in such a manner that the laminate structure covers the whole switch region.

As was described above, according to the present invention, the back board is provided for each of the plurality of switch regions. Hence, when it is required to store the mat switch, the latter can be folded down in such a manner that none of the switch regions is folded down. That is, the upper electrode sheet and the lower electrode sheet which are provided for each of the switch regions are not folded down Hence, the mat switch of the invention is free from the difficulty that it operates erroneously when it is carelessly folded down.

That is, even if the mat switch is repeatedly used and stored, the upper and lower electrode sheets will never be creased. Hence, the mat switch is free from the difficulty that, at the creased portions of the mat switch, the upper electrode sheet is brought into contact with the lower electrode sheet; that is, the switching operation takes place erroneously.

Furthermore, the mat switch of the invention is free from the difficulty that, while the mat switch is being used, its end portions are held, so that the mat switch is folded down by mistake; that is, the switching operation takes place erroneously.

According to the present invention, each of the back boards is readily provided being inserted into the pocket which is formed by welding two vinyl sheets. The insertion of the back board stretches the vinyl sheets, which stretches the upper electrode sheet and the lower electrode sheet. Hence, the difficulty is eliminated in that, depending on a change or a condition of storage, the upper electrode sheet is loosened, and bent by its own weight, thus being brought into contact with the lower electrode sheet; that is, the switching operation is carried out erroneously.

DETAILED DESCRIPTION OF THE PREFERRED EMBODIMENTS

Preferred embodiments of the invention will be described with reference to FIGS. 1 through 11.

In those figures, reference numeral 1 designates a mat switch. The mat switch 1 is connected to a multi-media apparatus which includes a computer system so that audio and/or video data are reproduced which are recorded in an optical disk such as a CD-ROM. As shown in a perspective view of FIG. 1 and a plan view of FIG. 2, the mat switch together with a control box 3 form a controller 5. The control box 3 has an ADB (Apple Disktop bus) cable 7 so that the mat switch 1 is connected to the multi-media apparatus.

Figure 1:
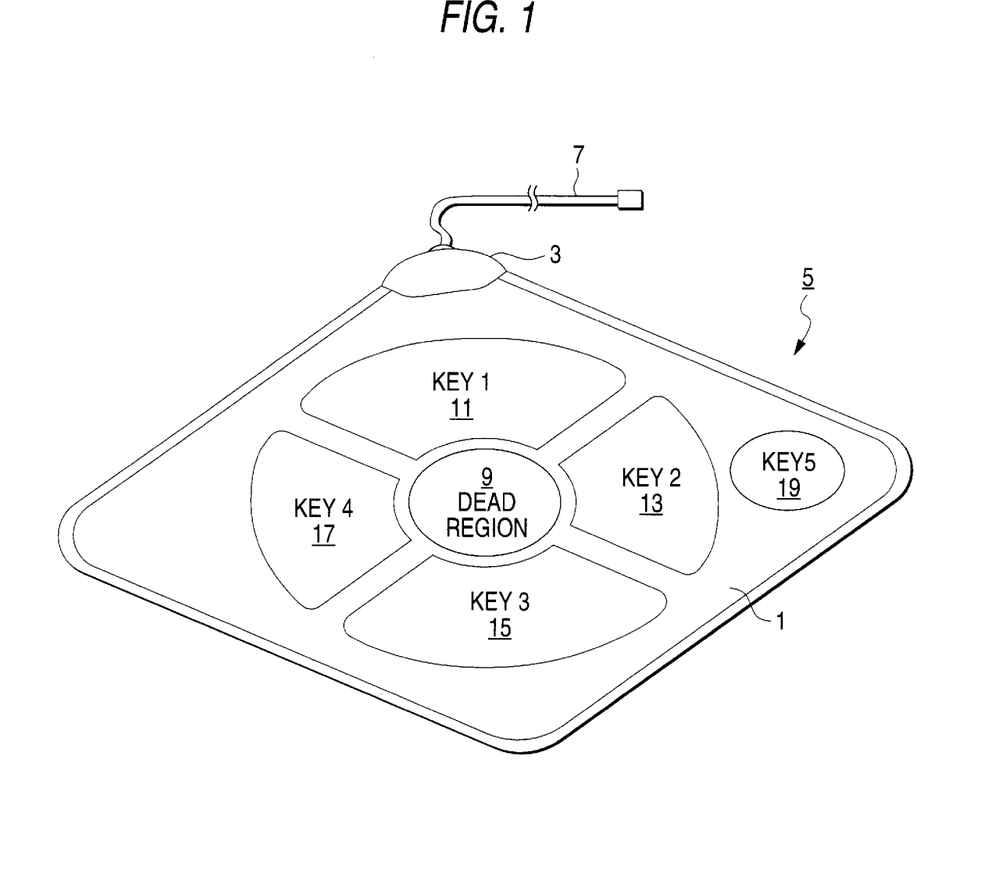
FIGS. 1 and 2 are a perspective view and a plan view, respectively, showing an example of a mat switch, which constitutes an embodiment of the invention.
Figure 2:
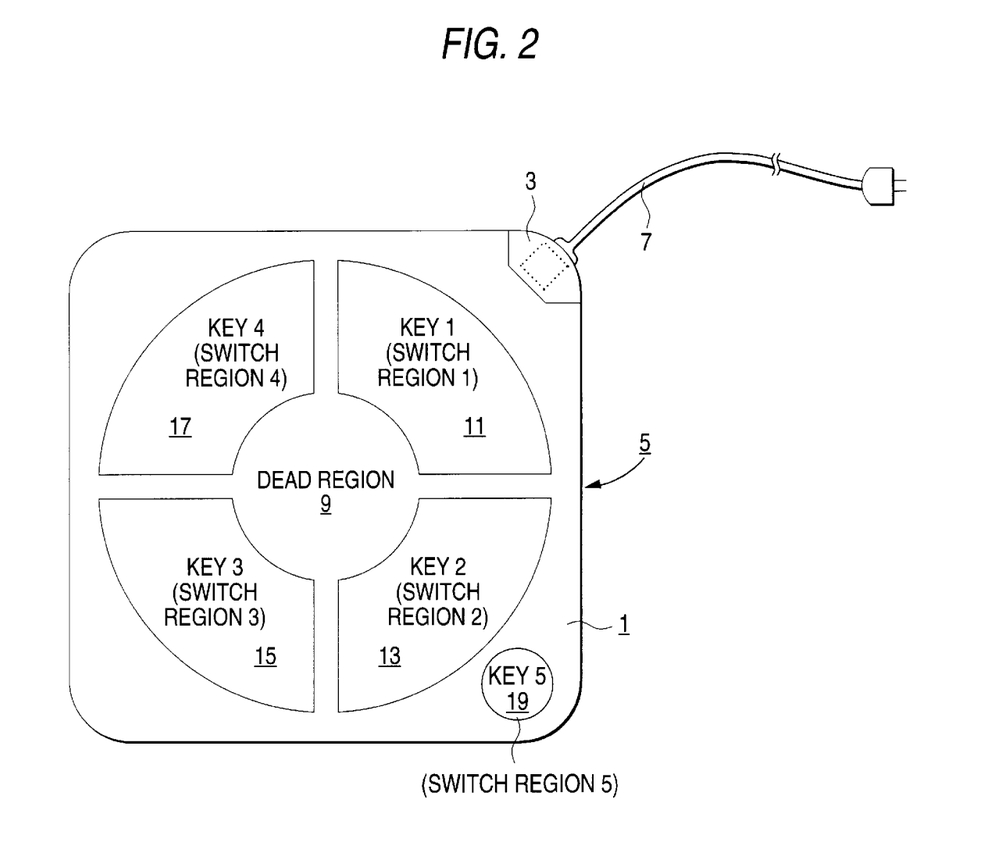

As shown in the plan view of FIG. 2, the mat switch 1 has a dead region 9 at the center which performs no switching operation even if it is pressed with the foot. The dead region 9 is surrounded by four switch regions 11, 13, 15 and 17 (hereinafter referred to as "first, second, third and fourth switch regions 11, 13, 15 and 17", when applicable), each of which is sector-shaped. In addition, the mat switch 1 has a fifth switch 19 beside the second switch region. The fifth switch 19 is round.

The structures of those switch regions will be described with reference to FIGS. 3 through 8.

Figure 6:
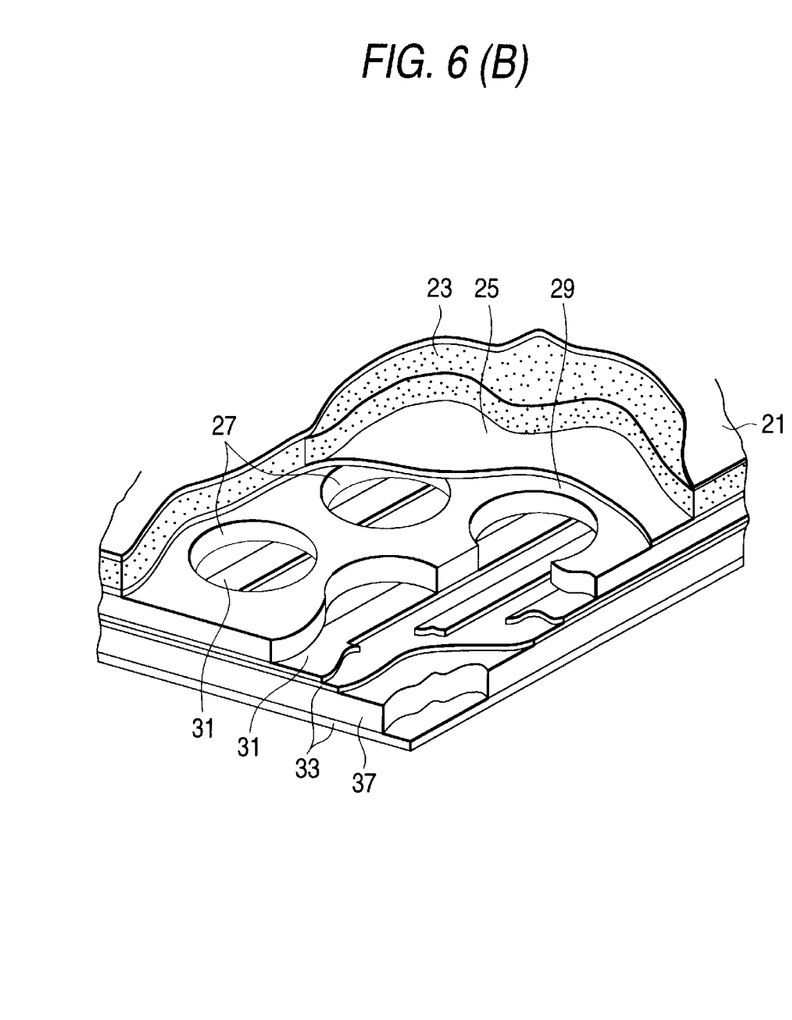
FIG. 6(A) is an enlarged diagram corresponding to FIG. 5.
FIG. 6(B) is an enlarged diagram, with part cut away, showing all layers in FIG. 6(A)
Figure 7:
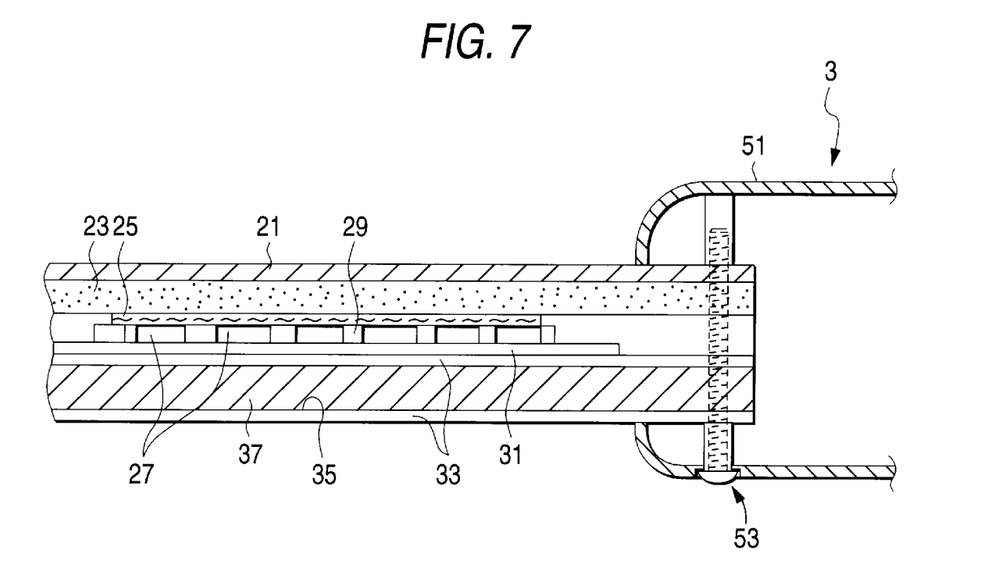
FIGS. 7 and 8 are sectional views showing parts of the mat switch, corresponding to FIG. 6(B)
Figure 8:
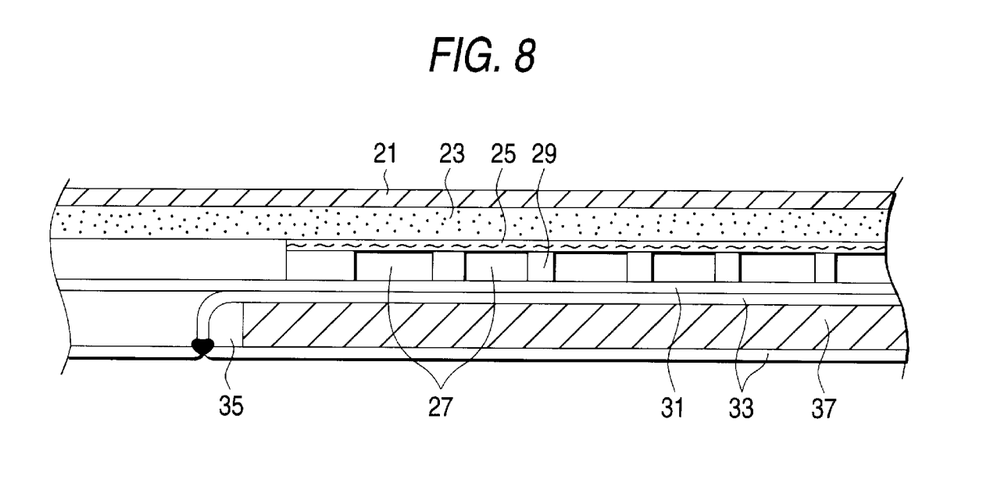

The structure of each of the switch regions, as shown in the part (B) of FIG. 6 and FIG. 7, is of a laminate, a stack of eight layers. That is, the uppermost layer, or the first layer, is a cover sheet 21, and the next layer, or the second layer, is a cushioning sheet 23. The third layer underneath the cushioning sheet 23 is an upper electrode sheet 25. The fourth layer underneath the upper electrode sheet 25 is an insulating spacer 29 having a number of through-holes 27. The fifth layer underneath the insulating spacer 29 is a lower electrode sheet 31 on which an electrically conductive pattern is formed. What is provided underneath the lower electrode sheet 31 is a back board 37 which is inserted into a pocket 35 which is formed by two layers of vinyl sheet 33 and 33.

Of those layers, the cover sheet 21 is called "a decorative sheet", on which marks indicating the switch regions 11, 13, 15 and 17, and other decorative marks are printed.

The cushioning sheet 23 is to absorb a shock which the feet may feel when they step on the mat switch.

The upper electrode sheet 25 is electrically conductive; that is, it is one electrically conductive solid sheet.

The insulating spacer 29 is for instance 0.5 mm in thickness, and has a number of through-holes 27. The through-holes 27 are each 12 mm in diameter, and they are formed at intervals of from 18 mm to 22 mm. The peripheral portion of the spacer 29 is bonded to the peripheral portion of the upper electrode sheet 25 with adhesive tape or adhesive agent. The above-described dimensions are not limitative. Qualitatively stated, it is necessary that, when a user, namely, a child steps on the mat switch, the amount of deflection of the upper electrode sheet 25 is more than the thickness of the spacer 29 at the aforementioned through-holes. The load per unitary area applied when the user steps on the mat switch 1 depends on the materials and thicknesses of the cover sheet 21 and the cushioning sheet 23, while the amount of deflection of the upper electrode sheet 25 depends on the flexibility of the upper electrode sheet 25. Hence, the above-described dimensions are determined with those relations taken into account. More specifically, the dimensions must be such that the switching operation is effected even if for instance a three-year old child 12 Kg in weight steps on the mat switch.

Figure 3:
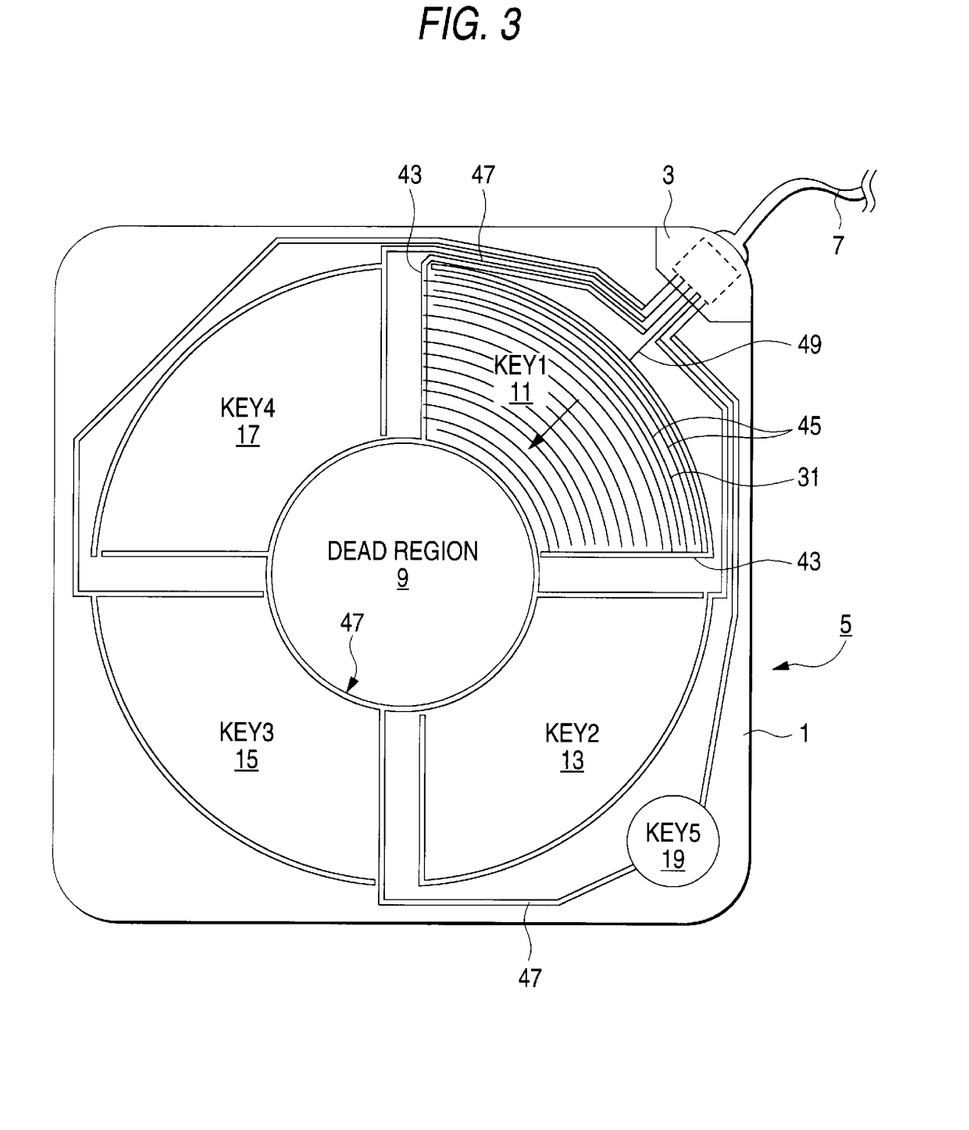
FIG. 3 is a diagram showing an electrically conductive pattern on a lower electrode sheet in FIG. 2.
Figure 5:
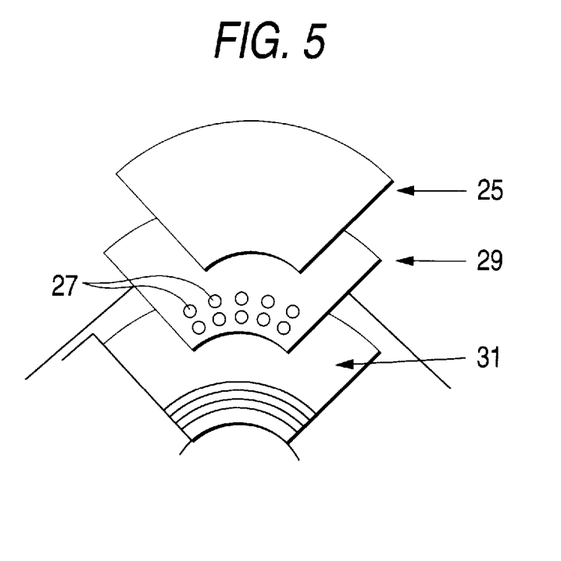
FIG. 5 is a perspective view showing essential parts of a laminate structure in a switch region in FIG. 3.

The lower electrode sheet 31 is as shown in FIGS. 3 and 5 and the part (A) of FIG. 6. The lower electrode sheet 31 has an electrically conductive pattern as shown in the part (A) of FIG. 6. The pattern 41 is called a comb-shaped electrode which is designed as follows: In each of the sector-shaped switch regions 11, 13, 15 and 17, two straight main lines are radially extended, and a number of arcuate branch lines 45 are extended from each of the main lines 43 in such a manner that they are in parallel with one another. Those branch lines are extended towards the other main line, but not reach it. That is, the arcuate branch lines extended from one of the main lines are intertwined with those extended from the other main line. The arcuate branch lines extended from the main lines are arranged in such a manner that they cover the whole switch region. The above-described main and branch lines 43 and 45 are arranged in all the switch regions 11, 13, 15 and 17, and of course in the fifth switch region 19 which is round.

In each of the switch regions, one of the two main lines 43 is a COM signal line (or a grounding signal line) 47, and the other is a data signal line 49. They are connected to the control box 3.

The vinyl sheets 33 function as a rear sheet covering the rear side of the mat switch 1. The vinyl sheets 33 are welded to each other by high frequency welding to form the pocket 35, in which the back board 37 is inserted.

The back boards 37 are to prevent the switch regions 11, 13, 15, 17 from being folded down. Hence, the mechanical strength of each of the back boards is such that it cannot be folded down with an ordinary force. Alternatively, its flexibility is such that it is bent to some extent; however, its switching operation will never be adversely affected. As is seen from FIG. 4, it is not always necessary that the planar configuration of the back board 37 is equal to that of the switch region. In order that the mat switch which is substantially square is folded down in four equal parts, the back boards 37 are each a quarter (¼) of the aforementioned square (the corner near the center of the mat switch being cut off). The material is a foamed polyethylene high in hardness, and 1.5 mm in thickness.

Figure 4:
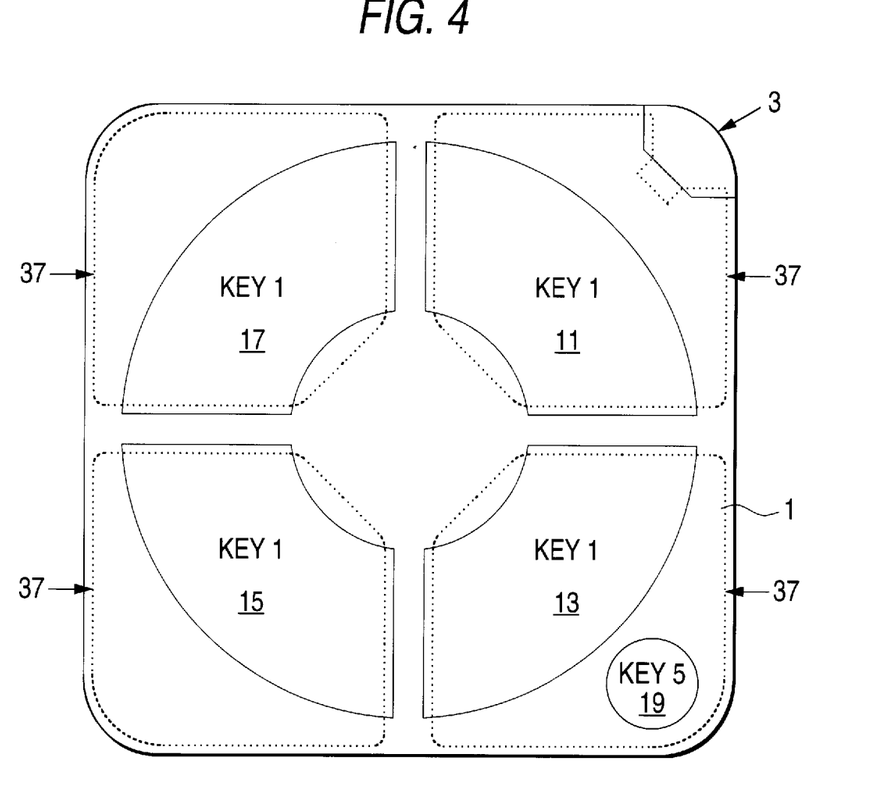
FIG. 4 is a diagram showing the arrangement of back boards in FIG. 2.

By increasing the weight of each of the back boards 37 slightly, the mat switch 1 can be stably set. That is, even when the mat switch is laid on a slippy floor such as a flooring, and the user quickly steps on the mat switch 1, the latter 1 is prevented from slipping or shifting, and moreover the user is prevented from tumbling down.

As shown in FIG. 4, of the switch regions 11, 13, 15, 17 and 19, the switch regions 13 and 19 are on one and the same back board 37. And the control box 3 is on the back board 37 on which the switch region 11 is provided.

As shown in FIG. 7, among the eight layers, the two upper layers 21 and 23 and the three lower layers 33, 37 and 33 are held with the housing 51 of the control box 3, and fixed with a tapping screw 53. In the outer periphery of each of the switch regions, the eight layers 21, 23, 25, 29, 31, 33, 37 and 33 are fixed to one another with adhesive tape or adhesive agent or by welding.

When the back board 37 is inserted into each of the pockets 35, which are formed by welding the vinyl sheets 33, and the vinyl sheets 33 are stretched, as a result of which the upper electrode sheet 25 and the lower electrode sheet 31 which are secured to the vinyl sheets 33 in the outer periphery of each of the switch regions by predetermined means are also stretched. Hence, the mat switch of the invention is free from the difficulties that, depending on a change or a condition of storage, the upper electrode sheet 25 is loosened, and bent by its own weight, thus being brought into contact with the lower electrode sheet; that is, the switching operation takes place erroneously.

Figure 9:
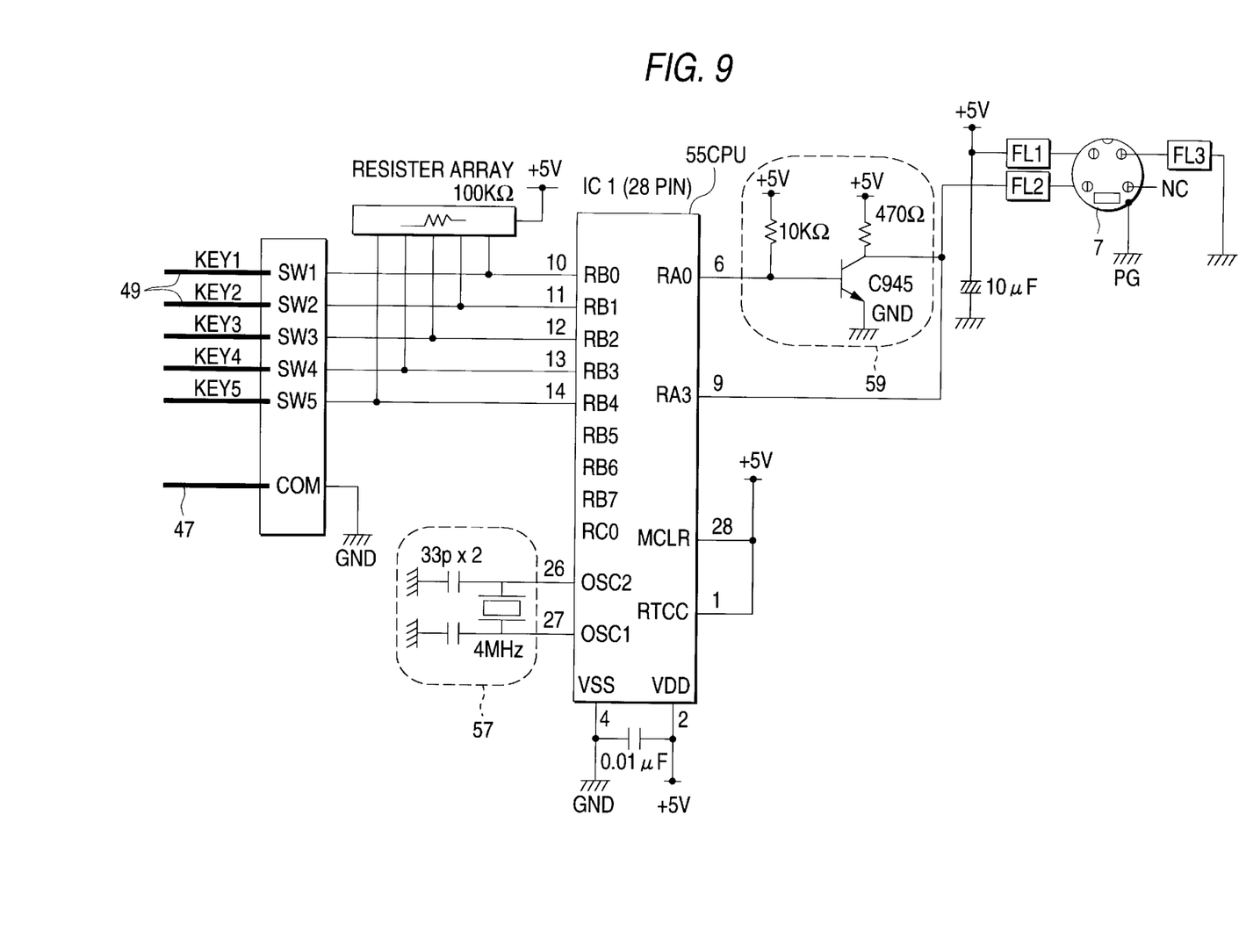
FIG. 9 is a circuit diagram of a control box shown in FIG. 1.
Figure 10:
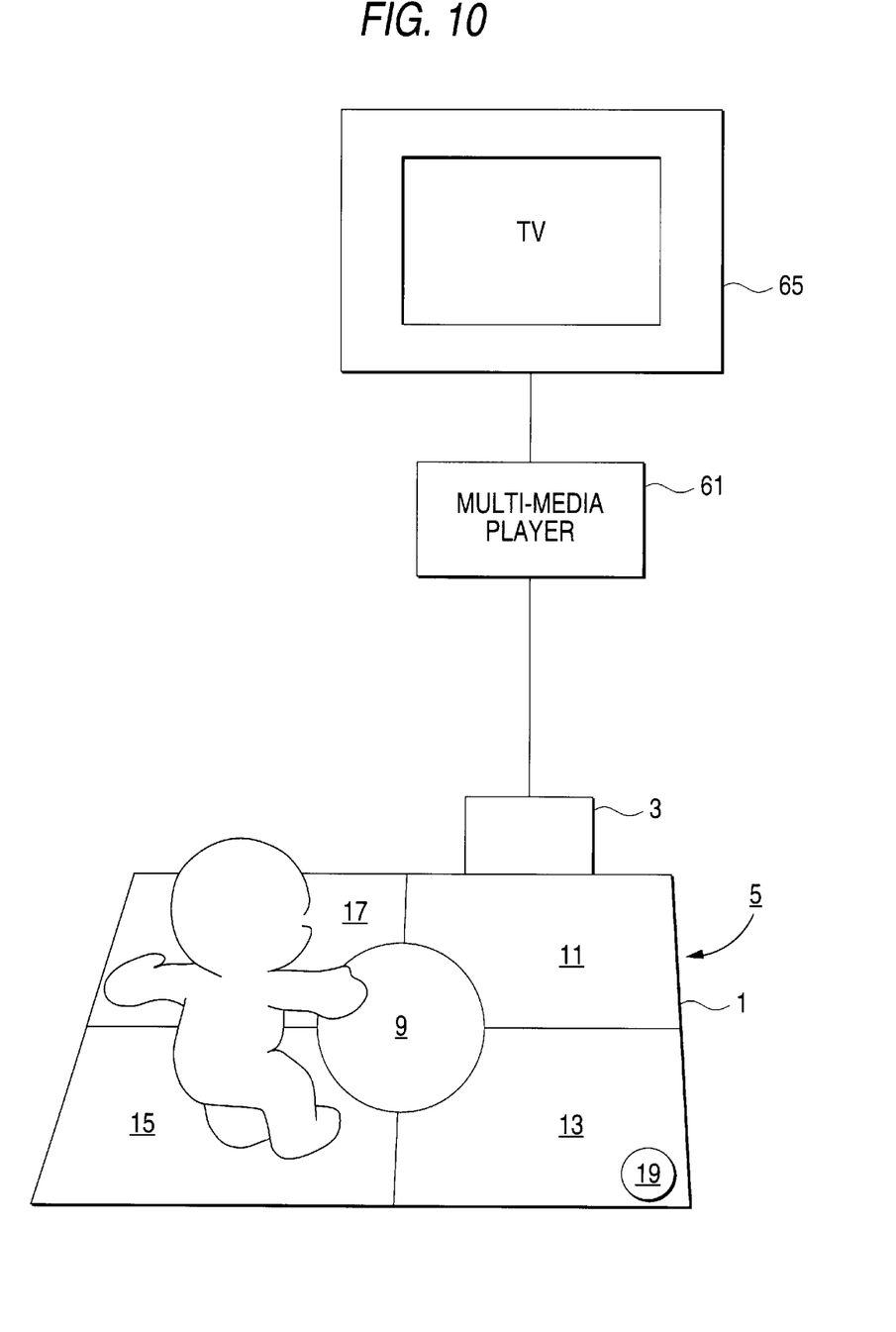
FIG. 10 is an explanatory diagram showing the mat switch of FIG. 1 which is connected through the control box to a multi-media player.
Figure 11:
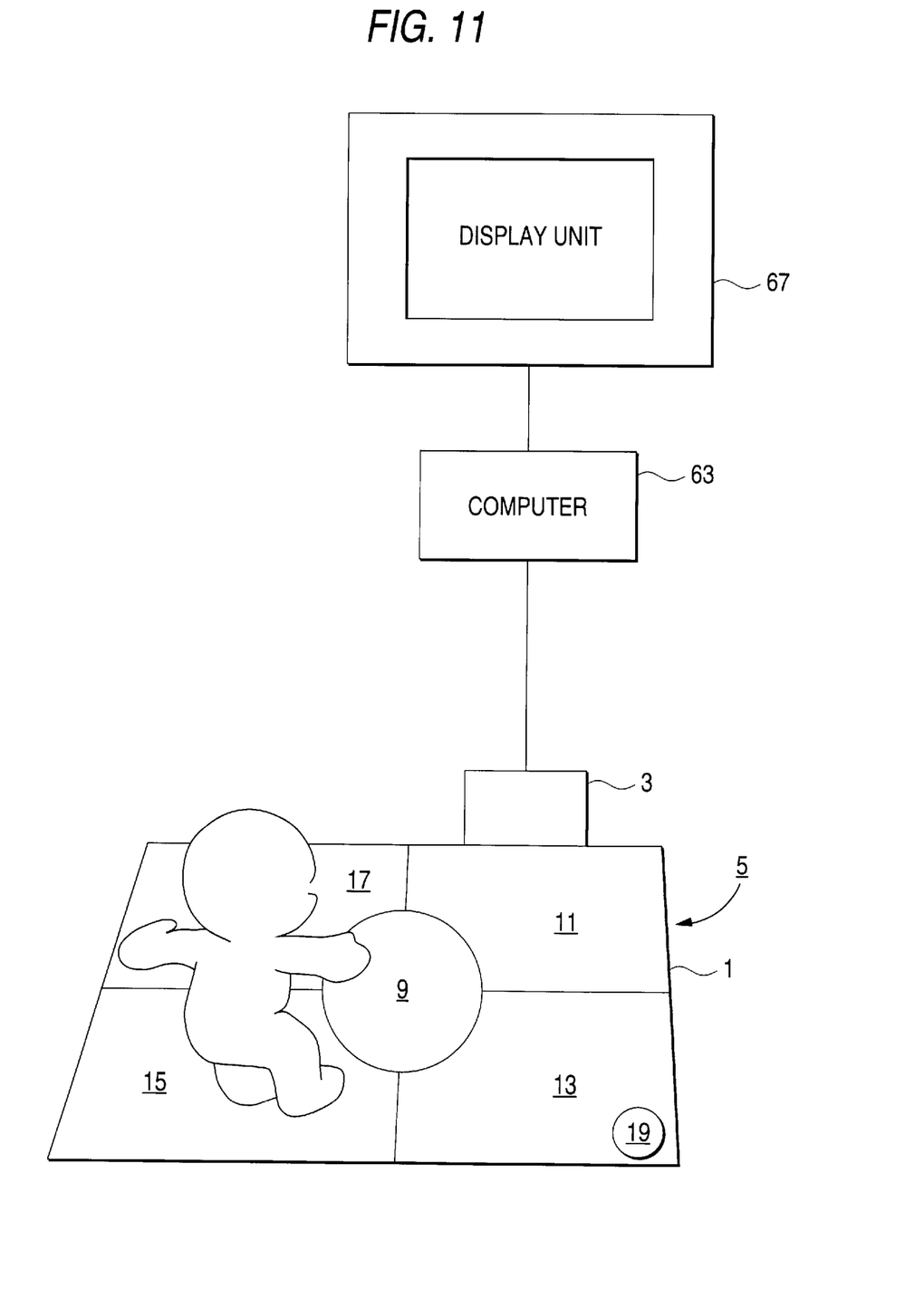
FIG. 11 is an explanatory diagram showing the mat switch of FIG. 1 which is connected through the control box to a computer.

FIG. 9 is a circuit diagram of the control box.

Five data signal corresponding to the five switch regions (designated reference characters KEY1 through KEY5 in FIG. 9) 11, 13, 15, 17 and 19 of the mat switch are applied through data signal lines 49, as parallel signals, to input ports (SW1 through SW5) of a CPU 55, where they are converted, into serial signals with the aid of a clock signal from a clock into signal generator 57. The serial signals are applied through an ADB communication interface circuit 59 to an ADB cable section 7.

When the data signal of a switch region is ON, the data signal (voltage signal) of the switch region indicates a voltage value which means that the resistance of the electro-circuit of the data signal becomes sufficiently low. That is, in the electro-circuit, the upper electrode sheet 25 is brought into contact with the lower electrode sheet 31 on which the comb-shaped electrodes are formed, and the contact resistance is much lower than a predetermined reference resistance value connected to a power source 5 V. A divided voltage provided by the contact resistance value and the reference resistance value is applied to the CPU 55.

When five data signals are applied to the CPU 55, a scanning operation is carried out according to a program built in the CPU 55, so that those data signals are detected. Upon detection of the data signals, those data signals are converted into codes. The codes are subjected to ADB communication processing, and applied through the ADB communication interface circuit 59 and the ADB cable section 7 to a multi-media apparatus, namely, a multi-media player 61 (such as "Pippin (phonetic)" and "Saturn (phonetic)") or a computer such as a computer "Macintosh" (manufactured by Apple Co.) (cf. FIGS. 10 and 11). Hence, an image and/or sound produced by an video terminal (such as a television screen 65 and a special display unit 67) connected to the multi-media player 61 or the computer is interactively operated.

Figure 12:
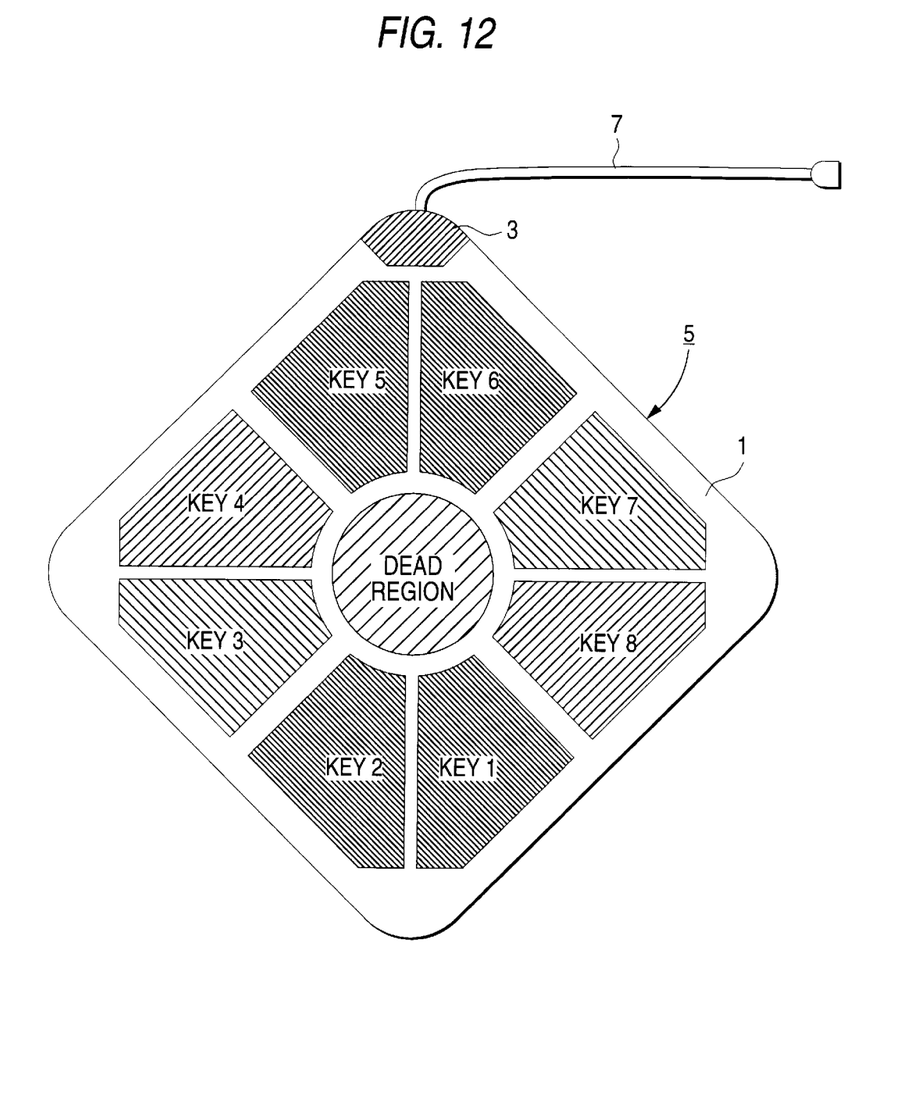
FIG. 12 is a plan view showing another example of the mat switch, which constitutes another embodiment of the invention.

The above-described embodiment has five switch region; however, the invention is not limited thereto or thereby. That is, the mat switch may be so modified that it has more than or less than five switch regions. FIG. 12 shows another example of the mat switch 1 which has eight switch regions (KEY1, KEY2, KEY3, KEY4, KEY5, KEY6, KEY7 and KEY8).

Figure 13:
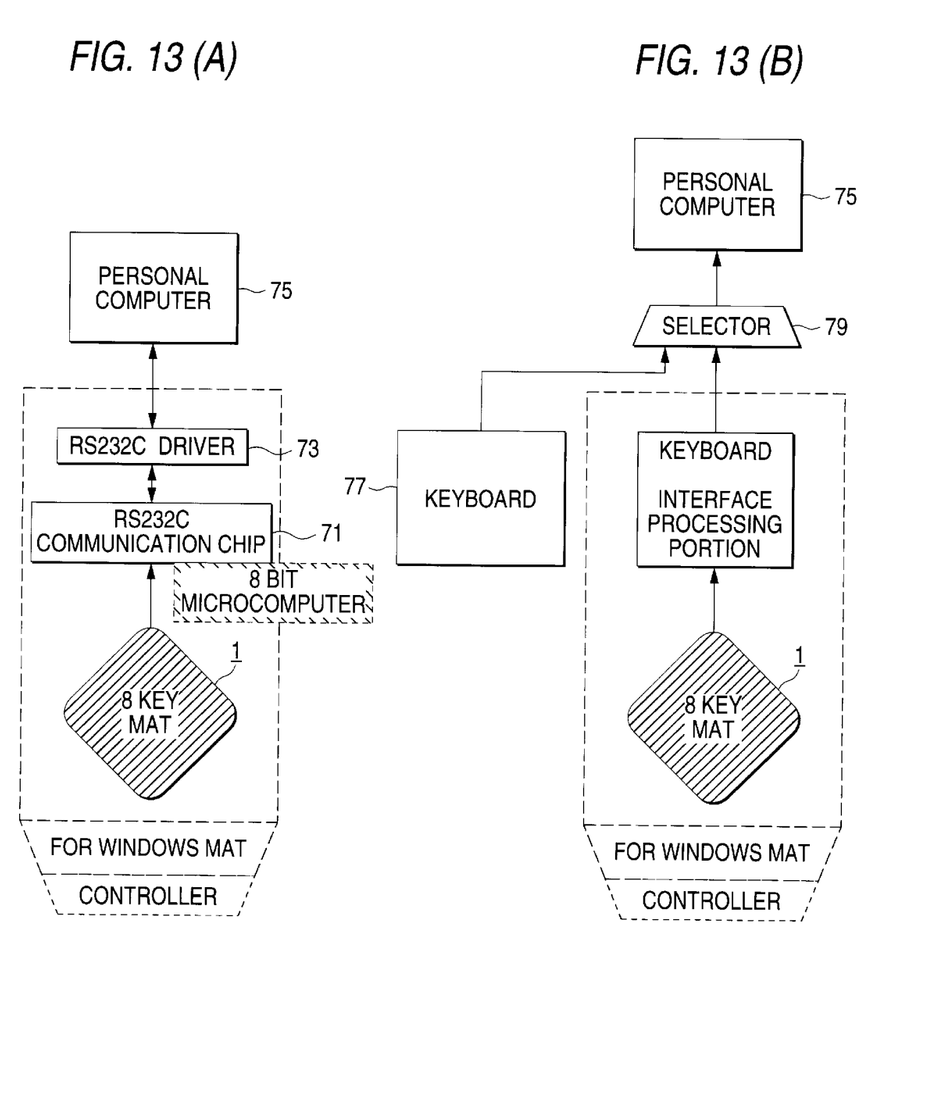
FIGS. 13(A) and 13(B) are explanatory diagrams for a description of communication systems in other examples of the mat switch, which constitutes other embodiments of the invention.

In the above-described embodiments, data signals from the mat switch 1 are transmitted by ADB communication; however, the invention is not limited thereto or thereby. That is, the mat switch 1 may be so modified that the data signals are transmitted by RS232C communication as shown in the part (A) of FIG. 13. In the case of a controller formed with this mat switch 1, a system "Windows" is employed as the OS (operating system) of a personal computer 75. For instance, an RS232C communicating chip 71 and an RS232C driver 73, which are built in an 8-bit microcomputer, are used to transmit the signals to a multi-media apparatus, namely, the personal computer 75.

Furthermore, the mat switch may be so modified as shown in the part (B) of FIG. 13. That is, the mat switch 1 may output the data signal which corresponds to an interface processing section for a keyboard provided for the personal computer 75, which is a multi-media apparatus. In this case, in order to use the existing keyboard, too, a selector 75 or a two-way socket may be employed.

As was described above, according to the present invention, the back board is provided for each of the plurality of switch regions. Hence, when it is required to store the mat switch, the latter can be folded down in such a manner that none of the switch regions is folded down. That is, the upper electrode sheet and the lower electrode sheet which are provided for each of the switch regions are not folded down. Hence, the mat switch of the invention is free from the difficulty that it operates erroneously when it is carelessly folded down.

That is, even if the mat switch is repeatedly used and stored, the upper and lower electrode sheets will never be creased. Hence, the mat switch is free from the difficulty that, at the creased portions of the mat switch, the upper electrode sheet is brought into contact with the lower electrode sheet; that is, the switching operation takes place erroneously.

Furthermore, the mat switch of the invention is free from the difficulty that, while the mat switch is being used, its end portions are held, so that the mat switch is folded down by mistake; that is, the switching operation takes place erroneously.

According to the present invention, each of the back boards is readily provided being inserted into the pocket which is formed by welding two vinyl sheets. The insertion of the back board stretches the vinyl sheets, which stretches the upper electrode sheet and the lower electrode sheet. Hence, the difficulty is eliminated that, depending on a change or a condition of storage, the upper electrode sheet is loosened, and bent by its own weight, thus being brought into contact with the lower electrode sheet; that is, the switching operation is carried out erroneously.

What is claimed is:

1. A mat switch which inputs a plurality of data to an apparatus to operate a video terminal connected to said apparatus, comprising:

a plurality of switch regions for inputting said plurality of data;

a laminate structure of each of said switch regions which is formed by laminating a cover sheet in common to all of said switch regions, an upper electrode sheet, a spacer, and a lower electrode sheet in the stated order, said upper electrode sheet being operative to come into contact with said lower electrode sheet when pressure is applied thereby performing a bridging contact function; and a separate and discrete, non-foldable back board provided below said lower electrode sheet in each of said switch regions, thereby permitting said mat switch to be folded down for storage such that none of said switch regions is folded down.

2. A mat switch which inputs a plurality of data to an apparatus to operate a video terminal connected to said apparatus, comprising:

a plurality of switch regions for inputting said plurality of data, each of said switch regions has a laminate structure including:

a cover sheet serving as the uppermost layer in common to all of said switch regions;

a cushioning sheet provided below said cover sheet;

an upper electrode sheet provided below said cushioning sheet, said upper electrode sheet being electrically conductive;

an insulating spacer having a number of holes which is provided below said upper electrode sheet;

a lower electrode sheet on which an electrically conductive pattern is formed, said lower electrode sheet being provided below said insulating spacer;

a pocket formed by two vinyl sheets which are provided below said lower electrode sheet; and a separate and discrete, non-foldable back board inserted into said pocket, thereby permitting said mat switch to be folded down for storage such that none of said switch regions is folded down, wherein said laminate structure covers the whole switch region, and wherein said upper electrode sheet is operative to come into contact with said lower electrode sheet when, pressure is applied and perform a bridging contact function.

\* \* \* \* \*